May 12, 1942.                    G. DAHLIN                    2,282,308
        MACHINE FOR INJECTION MOLDING OF THE INTERLOCKING
                ELEMENTS OF SLIDE FASTENERS
                    Filed May 4, 1939           3 Sheets-Sheet 1

Inventor
Gustaf Dahlin
By
        Attorney

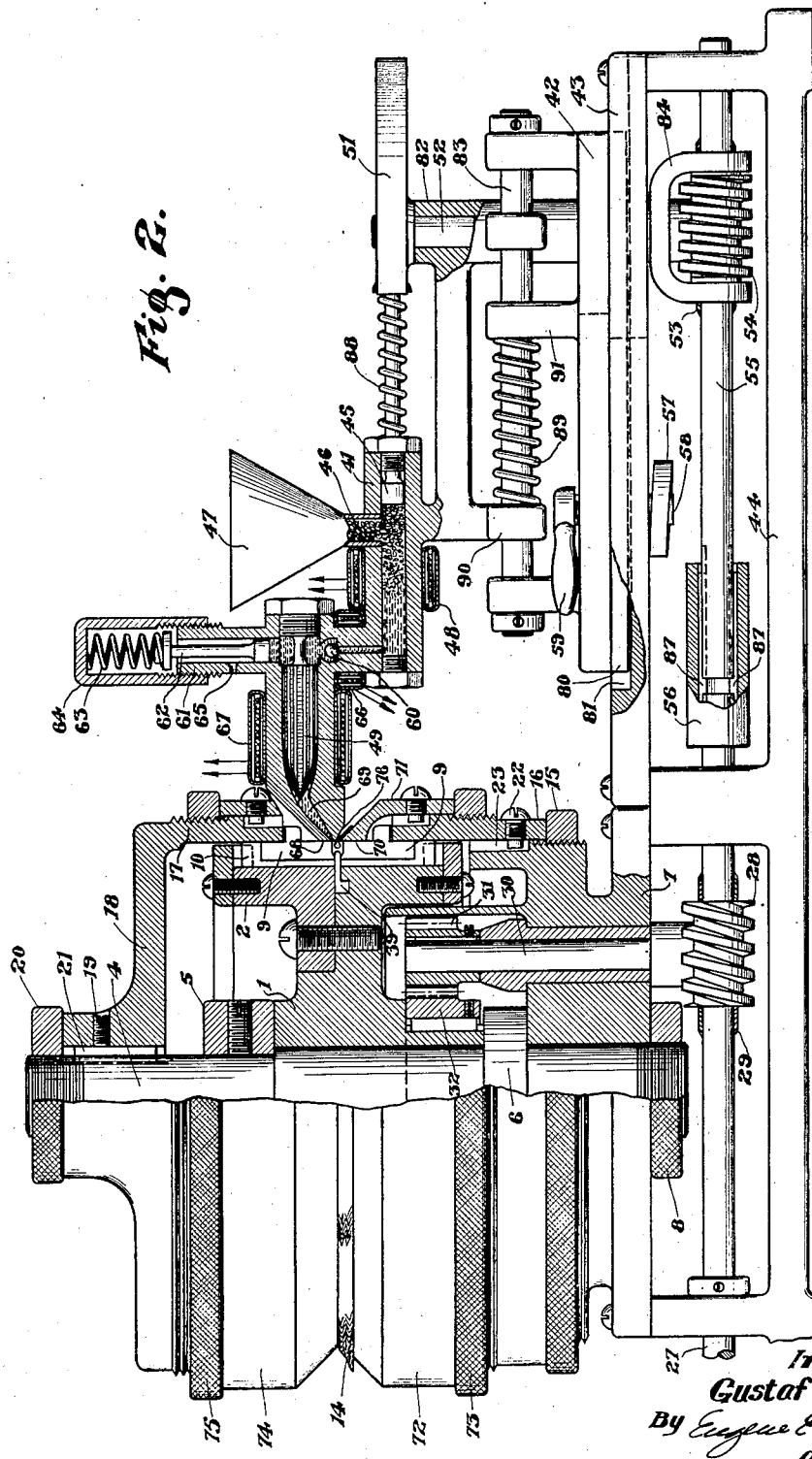

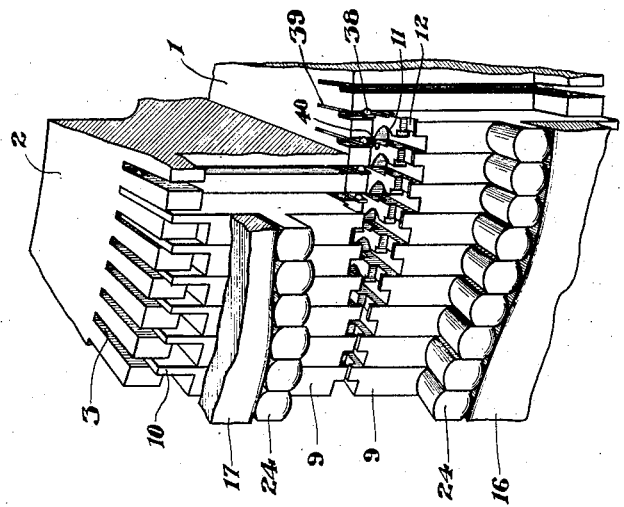
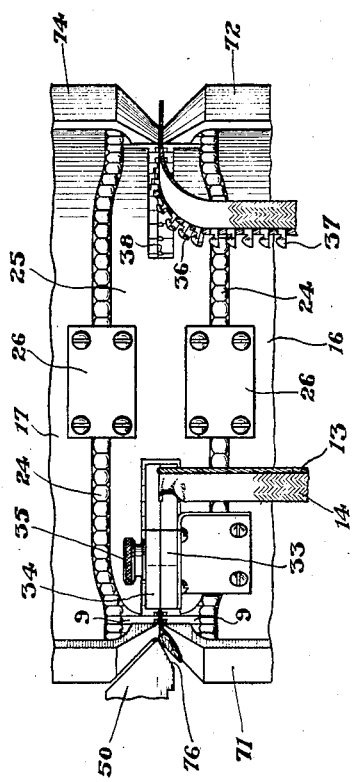

Patented May 12, 1942

2,282,308

UNITED STATES PATENT OFFICE 2,282,308

MACHINE FOR INJECTION MOLDING OF THE INTERLOCKING ELEMENTS OF SLIDE FASTENERS

Gustaf Dahlin, St. Catharines, Ontario, Canada, assignor to Lightning Fastener Company, Limited, St. Catharines, Ontario, Canada Application May 4, 1939, Serial No. 271,789

9 Claims. (Cl. 18—20)

The invention relates to improvements in machines for injection molding of the interlocking elements of slide fasteners, of the type comprising a pair of stringers each consisting of a flexible supporting member or tape having a plurality of spaced interlocking members secured thereto and adapted to interlock with the members of the other stringer by the movement of a slider therealong.

I am aware of prior devices having the same object in view, typical of which is that disclosed in United States Patent No. 1,975,966 in the names of Morin and Marinsky. In all such devices each interlocking element has been molded on the tape between a pair of die members which receive molding material from a nozzle either through a gate in the die members which forms a sprue on the interlocking members which must be subsequently removed, or directly from the nozzle, in which case, even if no sprue is formed, a roughness is produced on the element which interferes with its operation, and it is next to impossible to prevent freezing of the molding material in the nozzle between injection periods. Another objection to prior devices for such purpose arises from the fact that any injection molding operation requires a definite time cycle the length of which is governed by the viscosity of the molding material, the rate of heat dissipation from the die, and the molding pressure which may be employed. When one interlocking element has been molded at a time the rate of production of finished fastener stringer, due to the long molding cycle required for each element, has been so low as to be impractical from an economic standpoint, and when the interlocking elements have been molded in groups, there has remained the unavoidable operation of removing the sprue connecting the elements of each group as well as the difficulty of maintaining the required exactly uniform spacing between individual pairs of elements at the points where the groups of elements join on the stringer.

A particular object of the present invention is to provide a machine for molding interlocking elements directly onto the supporting member whereby no additional processing is required between supplying the molding material to the machine and removing the finished fastener stringer therefrom, which has a high output of finished fastener stringer and, at the same time, enables a relatively long molding cycle to be employed for each individual interlocking member, in distinction to prior devices of the same type in which the rate of production of finished stringer is governed by the length of the molding cycle required for each interlocking member.

A further object is to devise a machine of the type described in which no sprue is formed on the molded members, thereby eliminating waste of molding material and extra operations involved in removing the sprues.

A still further object is to produce a machine in which interlocking elements having depressions or undercut areas thereon, which interlocking members have been demonstrated to be the strongest and most satisfactory type, may be molded and may be ejected from the molding cavities freely and perfectly.

An additional object is to provide a machine for continuously molding interlocking elements on a tape which may be set up to produce a succession of stringers of uniform length with the customary gap spacing therebetween by a very simple adjustment with is absolutely positive in its action and by means of which any desired length of stringer within the lengths normally used commercially may be produced on one machine.

With the above and other objects in view, which will hereinafter become apparent as the specification proceeds, my invention consists, in a preferred embodiment, of the construction and arrangement all as hereinafter more particularly described and illustrated with reference to the accomapnying drawings in which:

Fig. 2 is a side elevational view thereof shown partially in longitudinal vertical section;

Fig. 3 is an enlarged fragmentary side elevational view showing the tape feed and stringer takeoff stations; and Fig. 4 is a still further enlarged fragmentary perspective view of the die members of the machine.

Like characters of reference designate corresponding parts in the different figures.

Figure 1:
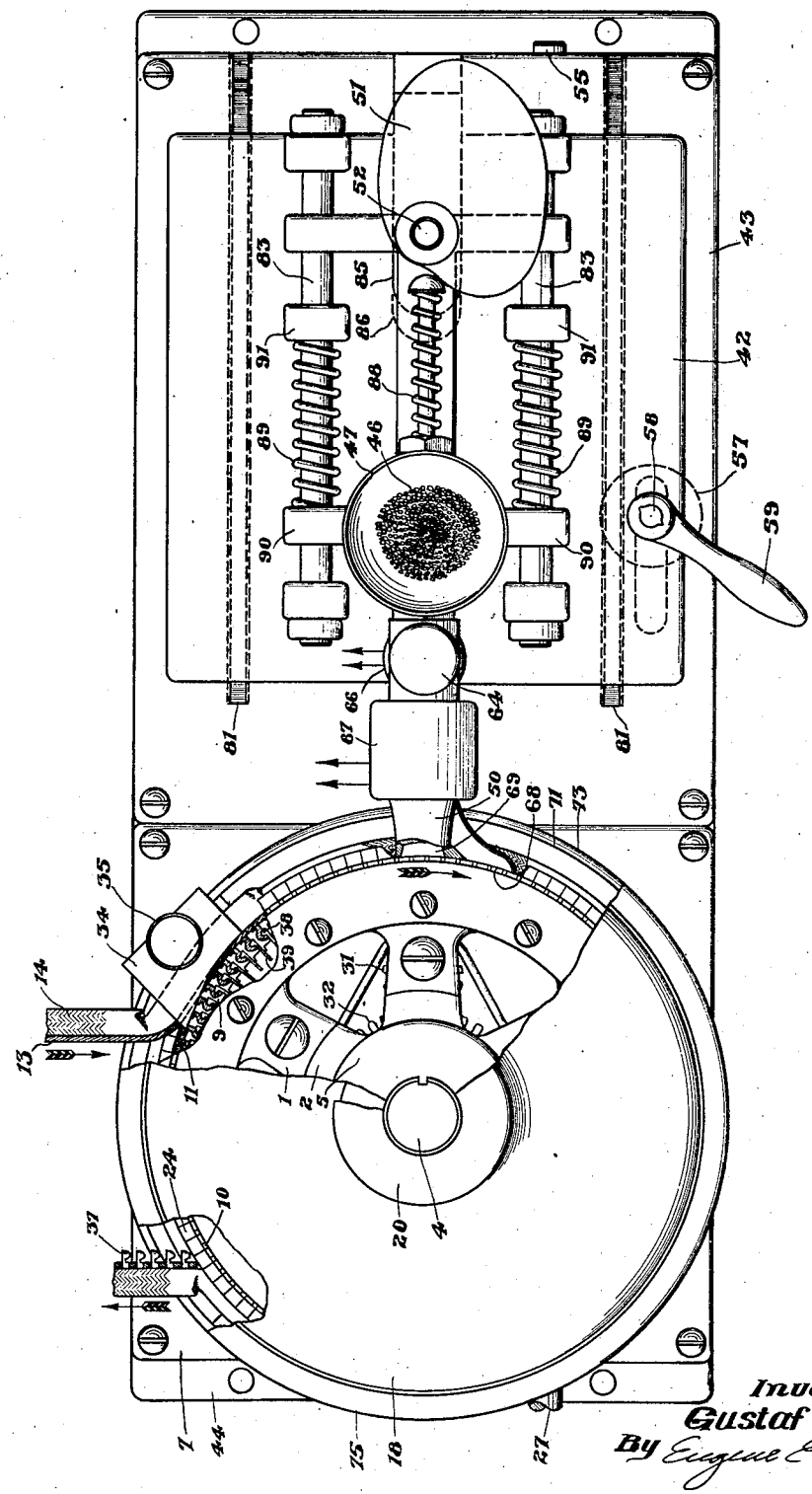
Fig. 1 is a plan view of my improved machine partially broken away to reveal the interior construction.

In the following disclosure, material from which the interlocking elements of the fastener are to be molded will be referred to as a thermoplastic molding powder, such as cellulose acetate, but it is to be understood that the machine is adaptable for use with any material which may be injected into a mold in the liquid state and hardened therein in a relatively short time, which would include certain thermosetting plastics as well as metals of low melting point, such as the orthodox die casting alloys.

Referring to the drawings, the machine may comprise a pair of substantially cylindrical members 1 and 2 clamped together to form a drum and provided with a plurality of radial slots 3. The drum is mounted for rotation on a shaft 4 and may be retained in position thereon by means of collars 5 and 6. The shaft 4 is mounted in a sub-base 7 by means of a nut 8.

On the peripheral surface of the drum formed by the members 1 and 2 a plurality of pairs of die members 9, 9 are positioned for reciprocation toward and away from each other by fins 10 which slide in the grooves 3. Each die member 9 has a cavity 11 formed in one end and a groove 12 traverses each cavity whereby each pair of die members may be clamped on the enlarged edge 13 of an orthodox fastener tape 14 with the edge 13 received in the groove 12.

The sub-base 7 is provided with a threaded collar 15 which adjustably supports a cam ring 16 and a complementary cam ring 17 forms part of a cover 18 supported on the shaft 4 which may be secured to the shaft 4 by a set screw 19 after adjustment by a nut 20. A key 21, and a screw 22 engaging a slot 23, respectively, prevent rotation of the cam rings 17 and 16 about the shaft 4. The cam rings 16 and 17 engage projections 24 on the die members 9 to close the respective pairs of members and a cam member 25, mounted between the rings 16 and 17 by means of plates 26, engages them to open each pair of die members as the drum is revolved by means of a shaft 27, driven by any suitable means such as electric motor (not shown), and which carries a worm 28 meshing with a gear 29 on a shaft 30 journaled in the sub-base 7 and terminating in a spur gear 31 which meshes with a ring gear 32 on the member 1.

The tape 14 is fed between the pairs of open die members 9, 9 through an orthodox guide consisting of a plate 33 mounted on the cam ring 16 and a cover plate 34 adjustably tensioned by a knurled screw 35.

A depression 36 in each interlocking member 37 of the fastener stringer is formed by a core member 38 carried on a preferably resilient plate 39, each of which may be mounted in a radial slot in the member 1. When each pair of die members 9, 9 is closed, the free extremity of each plate 39 is received in recesses 40 formed one in each of the die members in such manner that the molding cavity for an interlocking member is bounded by a pair of die members 9, 9, a core 38, and a portion of the surface of the plate 39.

Molding material for the interlocking members is supplied to the die cavities from an orthodox pressure cylinder 41. Such cylinder is mounted on a carriage 42 which is slidable on a sub-base 43 mounted on the main base 44, which also carries the sub-base 7, ways 80 travelling in grooves 81 maintaining the cylinder in longitudinal alignment on the base 44. The cylinder 41 is provided with the usual piston 45 and receives plastic material 46 from a hopper 47 to be melted by a conventional electric element 48 and forced through a conventional torpedo 49 to the injection nozzle 50. The piston 45 may be reciprocated for the injection stroke by a cam 51 on a shaft 52 which is journalled in a bracket 82 slidably mounted on guides 83, 83 which are supported on the carriage 42. The shaft 52 terminates in a gear 53 which meshes with a worm 54 on a shaft 55 which is journalled in a yoke 84 integral with the bracket 82, the carriage 42 and sub-base 43 being slotted, as indicated by the reference characters 85 and 86 respectively, to permit motion of the bracket 82. The shaft 55 is slidably received in a sleeve 56 on the shaft 27, keys 87, 87 providing a driving connection, which permits the carriage 42 to be adjusted toward and away from the injection end of the machine without interrupting the actuation of the piston 45. A spring 88 returns the piston against the cam 51. A conventional shifting and locking eccentric plate 57 carried on a shaft 58 threaded through the carriage 42 and terminating in an actuating handle 59 serves to shift the carriage 42 and lock it in any desired position. Spring 89, 89 on the guides 83, 83 are adapted to be compressed between arms 90, 90 on the bracket 82 and supports 91, 91 on the carriage 42 when the carriage is moved towards the injection end of the machine, whereby the nozzle 50 may be resiliently held against the die members 9.

The fluid molding material 46 passes into the torpedo 49 through a check valve 60 and the torpedo cylinder is open to an auxiliary cylinder 61 which acts as a surge chamber or means for maintaining a uniform hydrostatic pressure on the material in the torpedo during the return stroke of the piston 45. Such effect is obtained by means of a piston 62 in the cylinder 61 which is permanently urged inward by a spring 63 compressed between the end of the piston and a cap 64 threaded on the exterior of the cylinder 61. A blow hole 65 may be provided in the wall of the cylinder 61 just inside the outer limit of travel of the piston 62 and through which excess molding material may be released in the event that the feed from the hopper 47 is in excess of the molding capacity of the machine. Additional heating elements 66 and 67 serve to maintain the molding material in a liquid state while passing to the molding cavities.

The nozzle 50 is of unique form and is provided with a plane curved surface 68 which extends from the nozzle along the surfaces of the die members 9 adjacent the nozzle proper in the direction of rotation of the drum as indicated by the arrow in Fig. 1. Such surface 68, through which the transversely elongated molding material passage 69 extends, covers the portion of one die cavity 11 of each pair which corresponds to part of the rear surface of a finished interlocking member 37 behind the edge 13 of the tape, and a second plane curved surface 70 on a bearing member 71 rigidly carried on a cover ring 72 and adjustable by a nut 73, is coextensive with the length of the surface 68 of the nozzle 50 and covers the portion of the other cavity 11 of each pair which corresponds to the remainder of the rear surface of the interlocking member. A second cover ring 74 similarly adjustable by a nut 75 completes an enclosure for the die members 9 and their working parts and the two rings 72 and 74 also serve as guides around the drum for the tape 14. It will be obvious that the nozzle 50 is bevelled, as shown at 76, Fig. 2, to provide clearance between itself and the member 71 for the tape 14, and that the outer surfaces of the die members 9 are curved planes so that a substantially fluid-tight connection obtains between such surfaces and the surfaces 68 and 70.

The operation of the machine is as follows: The shaft 27 is driven by whatever means may be provided, which causes the drum formed by the members 1 and 2 to revolve in the direction shown by the arrow in Fig. 1 and as each pair of die members 9, 9 approaches the injection nozzle 50 the contours of the cam rings 16 and 17 are such that the die members are closed. They remain closed as they pass the nozzle and until they approach the point at which they were originally closed, whereupon they are engaged by the surfaces of the cam member 25 to open them. A tape 14 is fed through the guide plates 33 and 34 until it is clamped by a pair of dies which are just on the point of closing, whereupon successive die pairs clamp the tape and feed it around the drum circumference. Thus the tape passes the nozzle 50 with its edges clamped between successive pairs of die members 9, 9 over equidistantly spaced portions, successive pairs of die cavities 11 being brought into register with the orifice 69 of the nozzle, the plane surfaces 68 and 70 of the nozzle 50 and the member 71 respectively serving to complete the molding cavities for finished fastener members and the nozzle being held against the die members against the reaction of the springs 89. As the cavities pass the nozzle 50 a constant head of molding material is maintained in the nozzle by the reciprocating piston 45, the chamber 61 serving to prevent any release of pressure on the return stroke of the piston 45, and with the nozzle brought into liquid-tight frictional engagement with the surfaces of the die members 9 by actuation of the handle 59, each die cavity is filled with liquid molding material as it registers with the orifice 69 and the surfaces 68 and 70 hold the molding material in the cavities at the injection pressure until solid, the solidification, of course, taking place before each individual pair of die members is beyond the support of the surfaces 68 and 70. It should be noted that the orifice 69 is long enough to simultaneously register with more than one die cavity whereby any shrinking of the contents of any one cavity as the material strikes the cold cavity walls is made up from the continued pressure of liquid material from the nozzle, and also that the material in each cavity is "wiped" off the nozzle as the cavity passes the nozzle so that no sprue is left on the interlocking member. By the time each pair of die members has left the surfaces 68 and 70 the plastic material therein will be solidified sufficiently to maintain its shape when supported by the die members alone, and as the members do not open until the drum has revolved approximately an additional 180° the moldings will be completely solid by the time the ejection point is reached. It should be noted that as the filled cavities reach the cam member 25 which opens them, the die members 9 are withdrawn from the interlocking members while the core members 38 remain stationary, and as the die members are then free of the molded member, the finished stringer may be rolled off the core members by flexing the tape 14 in substantially the same manner as one stringer is freed from its mate in operating a finished fastener.

As so far described, the machine would make continuous lengths of fastener stringers with the interlocking elements uniformly spaced. In order to make the relatively short lengths having a length of tape at each end free of interlocking members required for commerce it may be desirable to cut up such a continuous stringer into uniform lengths and strip off a uniform number of interlocking elements from each end. If desired, however, my machine may be made to interrupt the continuous molding of interlocking members over predetermined lengths of the tape at predetermined intervals by substituting at appropriate locations on the drum member blank die members 9, which are the same shape as those shown in Fig. 4, except that they carry no die cavities 11 but only the grooves 12 for the tape margin. Then, as the dummy die members surrounding the tape pass the nozzle 50, no plastic material can be injected from the nozzle, and the tape will be provided with uniform groups of interlocking elements spaced by blank areas. The chamber 61 will be of particular value in such application as it will accommodate the plastic material which is not injected onto the tape over the blank areas.

From the foregoing disclosure it will be obvious that I have devised a machine for molding interlocking elements of a slide fastener directly onto the fastener tape which is capable of a very high rate of production and which, at the same time, permits a long molding cycle for the individual members, since each member is retained in its molding cavity for substantially three quarters of a revolution of the drum even though some hundreds of members may be produced by each revolution of the drum. It will also be evident that since no sprues are produced on the interlocking members, waste in manufacture is kept at a minimum and a smoother surface is imparted to the members. The machine is also extremely flexible in operation, in that stringers of different lengths may be readily made, and the control of stringer length and spacing of the interlocking members is absolutely positive and incapable of change during any particular setting of the control.

While I have shown and described in this application one embodiment which my invention may assume in practice, it will be understood that such disclosure is merely for purposes of illustration and description and that various other forms may be devised within the scope of my invention as defined in the appended claims.

What I claim as my invention is:

1. In a machine for injection molding of interlocking elements for slide fasteners directly onto a flexible supporting member, a train of pairs of die members reciprocable toward and away from each other, cam means for successively clamping each pair of die members onto the flexible supporting member to form a mold cavity for an interlocking member and for maintaining a substantial proportion of consecutive pairs of the train in closed position, a molding station, means for continuously feeding the train of pairs of die members with the flexible supporting member clamped therebetween past the molding station, and means at the molding station for supplying molding material to each mold cavity in succession.

2. In a machine for injection molding of interlocking elements for slide fasteners directly onto a flexible supporting member, a train of pairs of die members reciprocable toward and away from each other, cam means for successively closing each pair of die members onto the flexible supporting member and for maintaining a substantial proportion of consecutive pairs of the train in closed position, a core member and a resilient support therefor disposed between each pair of die members and the adjacent pair and cooperating with one pair of die members when in the closed position to form a mould cavity for an interlocking member, a molding station, means for continuously feeding the pairs of die members with the flexible supporting member clamped therebetween past the molding station, and means at the molding station for supplying molding material to each mold cavity in succession.

3. In a machine for injection molding of interlocking elements for slide fasteners directly onto a flexible supporting member, a rotatable drum, rotating means therefor, a stationary cam surface extending around the drum periphery, a plurality of pairs of die members slidably mounted on the drum periphery with one member of each pair in engagement with the cam surface for reciprocation toward and away from the other member of the pair in a direction parallel to the drum axis on rotation of the drum, said cam surface being so contoured as to maintain each pair of die members in juxtaposition over the greater part of a revolution of the drum and separated over the lesser part of a revolution, means for feeding the flexible supporting member between the pairs of die members when separated to be clamped therebetween on rotation of the drum, and stationary means for supplying molding material to the pairs of die members clamped on the flexible supporting member as each of such pairs in succession passes thereby.

4. In a machine for injection molding of interlocking elements for slide fasteners directly onto a flexible supporting member, a rotatable drum, rotating means therefor, a stationary cam surface extending around the drum periphery, a plurality of pairs of die members slidably mounted on the drum periphery with one member of each pair in engagement with the cam surface for reciprocation toward and away from the other member of the pair in a direction parallel to the drum axis on rotation of the drum, said cam surface being so contoured as to maintain each pair of die members in juxtaposition over the greater part of a revolution of the drum and separated over the lesser part of a revolution, a core member and a resilient support therefor disposed between each pair of the pairs of die members and each cooperating with one pair of die members when such members are juxtaposed to form a mold cavity for an interlocking member, means for feeding the flexible supporting member between successive pairs of die members when separated to be clamped therebetween on rotation of the drum, and stationary means for supplying molding material to each mold cavity as each cavity in succession passes thereby.

5. A machine as claimed in claim 4, wherein the means for applying molding material to the mold cavity comprise a molding material supply chamber, a conduit leading therefrom and terminating against the die members in the juxtaposed position and registering with the mold cavity formed thereby, and means for maintaining pressure on the contents of the supply chamber.

6. A machine for injection molding of interlocking elements for slide fasteners directly onto a tape comprising a base, a drum journalled therein and provided with a plurality of radial slots equidistantly spaced around its periphery, a pair of die members slidably disposed in each slot, a pair of cam surfaces rigidly mounted on the base and extending around the greater portion of the drum periphery for closing the pairs of die members and maintaining them closed over the greater part of a revolution of the drum, a second pair of cam surfaces rigidly mounted on the base adapted to engage the pairs of die members over the lesser portion of the drum periphery for opening the members, means for continuously rotating the drum, means for feeding a tape continuously between the pairs of die members when in the open position to be clamped therebetween in the closed position, a molding material supply chamber mounted on the base and means for conducting molding material under pressure from the supply chamber to each pair of closed die members as the closed members pass the chamber.

7. In a machine as claimed in claim 6, a core member radially disposed on the drum periphery adjacent the parting line of each pair of die members and adapted to form a depression in each interlocking member when the die members are closed and to permit free ejection of the interlocking member when the die members are open.

8. A machine as claimed in claim 6 wherein the means for conducting molding material under pressure comprises a conduit from the supply chamber, means for maintaining the conduit outlet in frictional substantially fluid-tight engagement with the surfaces of the die members as the members pass the outlet during rotation of the drum, and means for maintaining a constant hydrostatic pressure on molding material in the conduit, the interlocking element molding cavity formed by each pair of closed die members being adapted to register with the conduit outlet as the members pass the conduit on rotation of the drum.

9. A machine as claimed in claim 6 wherein a group of consecutive pairs of said die members are replaced by a group of pairs of blank tape clamping members which block said means for conducting molding material as the tape clamping members pass said chamber.

GUSTAF DAHLIN.